United States Patent Office 2,784,516
Patented Mar. 12, 1957

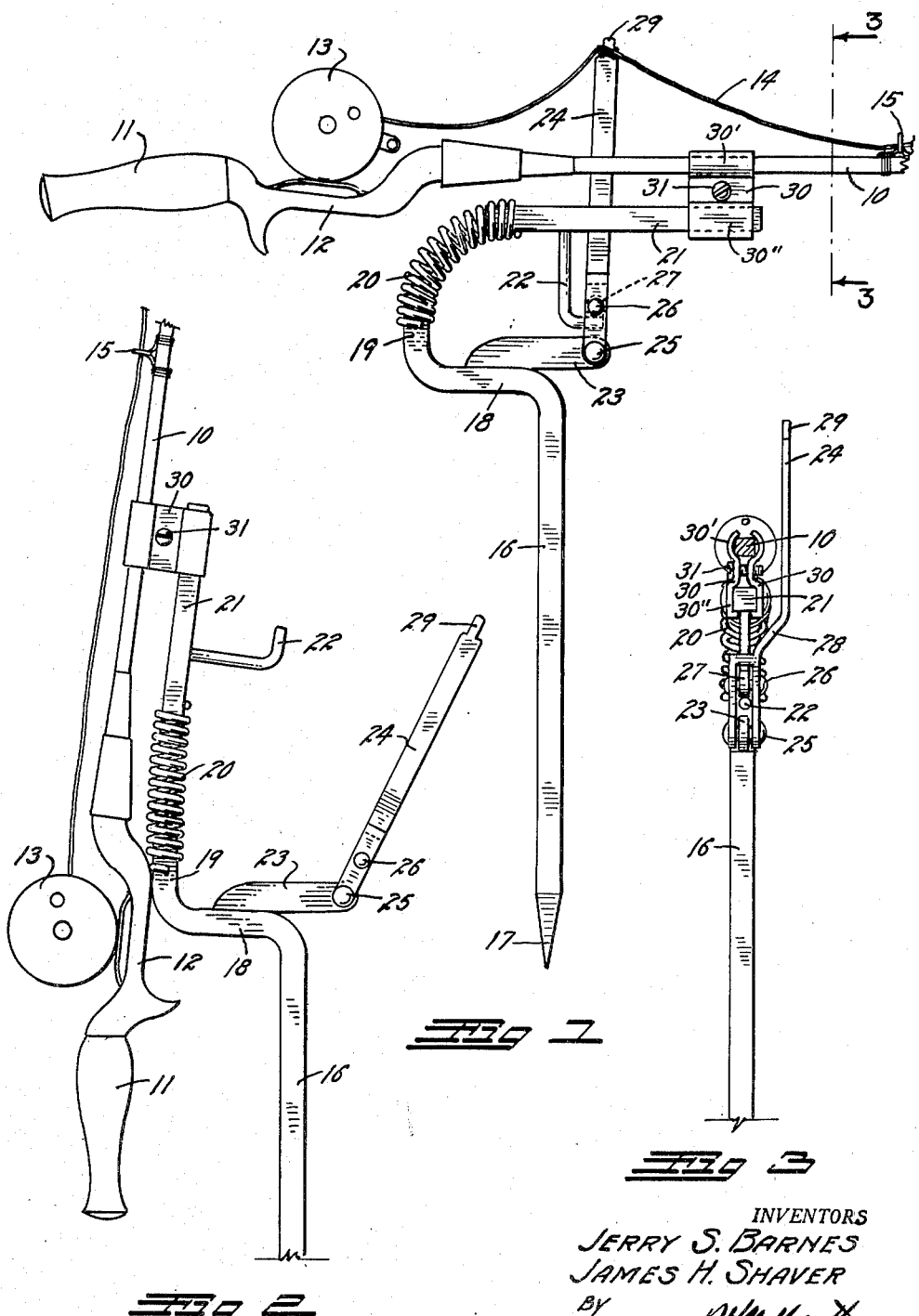

2,784,516

AUTOMATIC FISHING ROD HOLDERS AND RETRIEVERS

Jerry S. Barnes, Elizabeth, Colo., and James H. Shaver, Goodland, Kans.

Application August 30, 1956, Serial No. 607,199

5 Claims. (Cl. 43—16)

This invention relates to a fishing rod holding and retrieving device, and has for its principal object the provision of a simple, inexpensive, easy to use, and highly efficient device which can be used by an indolent fisherman to hold his fishing rod in the proper fishing position while awaiting the fish, and which, when the fish "strikes," will instantly swing the rod upwardly to land the fish.

Another object is to simplify the construction of such a device so that it will have a minimum number of relatively simple parts which can be economically manufactured, and which will be trouble-free in use.

A further object is to provide a fishing rod retriever which will be light in weight and readily portable, and which can be quickly and easily applied to any of the conventional styles of fishing rods.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the improved fishing rod retriever, with a conventional fishing rod in place thereon, as it would appear in the set or fishing position;

Fig. 2 is a similar view illustrating the appearance of the device and rod in the released position; and Fig. 3 is a front view of the improved rod retriever as it would appear on the section line 3—3 in Fig. 1.

The invention is designed for use on any desired fishing rod or pole. In the drawing, a conventional rod is illustrated at 10, with its handle at 11 and reel seat at 12. A conventional reel 13 is mounted on the reel seat 12 from which a fishing line 14 extends. The rod 10 is, of course, provided with the usual line guide rings, such as indicated at 15.

The improved rod holding and retrieving device as illustrated is mounted upon a square metal stake 16 provided with a relatively sharp, ground-engaging point 17. The upper extremity of the stake 16 is bent at a right angle to one side to form a horizontal portion 18, and is thence bent upwardly to form a vertical spring-receiving extremity 19.

A relatively heavy, close-wound, helical spring 20 is fitted over and secured to the extremity 19 and extends normally in vertical alignment therewith. A square whip bar 21 is fitted into and secured in the upper extremity of the spring 20 and normally extends in vertical alignment therewith. The spring 20 can be secured to the extremity 19 and the whip bar 21 in any desired manner, such as by a force fit or by brazing, welding, or silver-soldering.

An L-shaped trigger hook 22 is mounted in and projects forwardly and upwardly from the whip bar 21, when the latter is in the vertical released position of Fig. 2. A bracket piece 23 is welded or otherwise affixed to the horizontal portion 18 and extends upwardly and forwardly therefrom.

A trigger lever 24 is hinged upon the forward extremity of the bracket piece 23 upon a suitable hinge pin or rivet 25. The hinged extremity of the trigger lever 24 is bifurcated so as to pass on both sides of the bracket piece 23, both furcations being hingedly mounted on the rivet 25.

A roller pin 26 extends through the bifurcated extremity of the trigger lever 24 and rotatably supports a trigger roller 27 between the furcations and above the hinge rivet 25. The trigger lever 24 is offset, as indicated at 28, above its bifurcated lower extremity so that it may pass freely upward at one side of the device, as illustrated in Fig. 3. The upper extremity of the trigger lever 24 is reduced in width to form a line-receiving stud 29 thereon.

The fishing rod is mounted upon the retrieving device by means of two clamp plates 30 secured together by means of a clamp screw 31. The clamp plates 30 are similar in design, and each is provided with an upper groove channel 30' for receiving the fishing rod, and a lower groove channel 30'' for receiving the whip bar 21. It can be seen that when the clamp screw 31 is tightened with the rod and bar in place, the latter two members will be fixedly secured together. The clamp plates may be applied to the fishing rod at any desired point therealong, preferably closely adjacent the handle extremity thereof.

Let us assume that the fishing rod has been applied to the device as illustrated, and that it is desired to place the device in use.

The stake 16 is forced into the ground at the shore of a stream or lake. The whip bar 21, with its attached rod, is bent forwardly, flexing the spring 20, so that the rod will extend over the water. The trigger lever 24 is now swung rearwardly to place the roller 27 over the trigger hook 22, so as to maintain the rod in the horizontal or forwardly extending position of Fig. 1.

The line is let out to the desired fishing position and is then wrapped about the line stud 29, preferably with a half-hitch knot. The spool of the reel is locked by means of the spool lock with which such reels are provided, and the outfit is ready to receive the expected fish.

When a fish strikes the bait and draws upon the line, it will pull the upper extremity of the trigger bar forwardly so that the roller 27 will roll from the trigger hook 22 to release the latter. The inherent resiliency of the released spring 20 will cause it to snap or whip upwardly to its normal straight-line position, as shown in Fig. 2, thus whipping the rod to engage the hook and pull the fish from the water.

As the rod snaps upwardly, the line will be pulled from the line-receiving stud 29 and will resume its normal position along the rod.

While the device has been described for use in the ground along the water's edge, it is conceivable that the stake 16 could be secured to the gunwale of a boat or to the railing of a pier by any suitable attachment means.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A holding and retrieving device for a fishing rod and fishing line comprising: a supporting stake; a normally straight, cylindrical, helical spring affixed on and extending normally vertically from said stake; a whip bar mounted in and extending normally in vertical alignment with said spring; means for securing said rod to said whip bar; a trigger hook affixed to and extending forwardly and upwardly from said whip bar; a trigger lever hingedly mounted on said stake and extending upwardly therefrom for engaging said trigger hook when said whip bar has been swung forwardly to a substantially horizontal position by flexure of said spring, said trigger lever being adapted to be secured to said line so that tension in the latter will swing said trigger lever to cause said engaging means to release said trigger hook.

2. A holding and retrieving device for fishing rods and lines as described in claim 1 in which the upper extremity of said stake is offset rearwardly to form a horizontal portion and thence upwardly to form a vertical terminal extremity upon which and in alignment with which said spring is mounted.

3. A holding and retrieving device for fishing rods and lines as described in claim 2 having a bracket piece mounted on and extending forwardly from said horizontal portion, said trigger lever being hingedly mounted on the forward extremity of said bracket piece.

4. A holding and retrieving device for fishing rods and lines as described in claim 3 in which the lower extremity of said trigger lever is bifurcated so as to pass on both sides of said bracket piece and upon both sides of said trigger hook, and in which the means for engaging the trigger hook comprises a roller rotatably mounted between the furcations of said trigger lever above said hook.

5. A holding and retrieving device for fishing rods and lines as described in claim 4 in which the means for securing said fishing rod to said whip bar comprises two clamp plates, each having an upper indented channel for receiving said rod and a lower indented channel for receiving said whip bar, and a clamp screw extending between said clamp plates and arranged to clamp the two plates toward each other so as to engage said rod and said whip bar simultaneously.

References Cited in the file of this patent
UNITED STATES PATENTS

| | | |
|---|---|---|
| 2,454,458 | Kaetker | Nov. 23, 1948 |
| 2,578,887 | Jackson et al. | Dec. 18, 1951 |
| 2,744,351 | Smith | May 8, 1956 |